M. F. HIGBEE.
RAKER GAGE.
APPLICATION FILED JAN. 7, 1911.
1,003,904.
Patented Sept. 19, 1911.
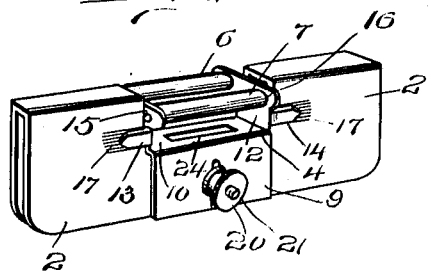
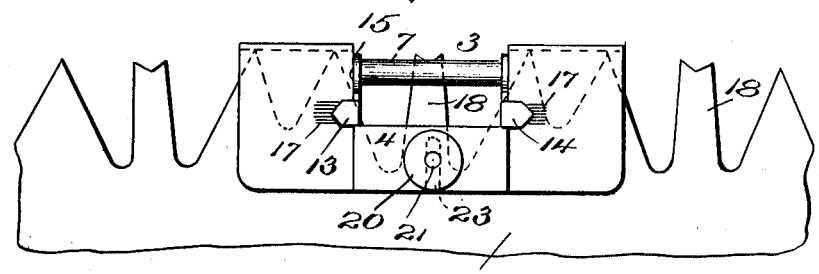
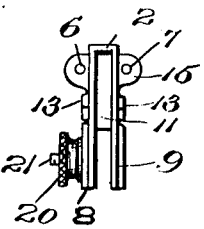
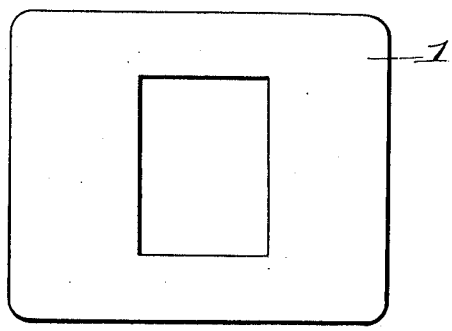
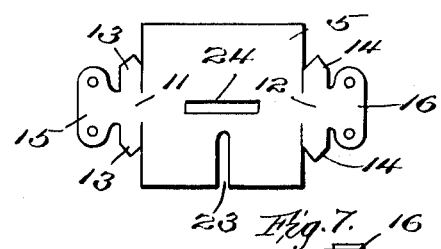
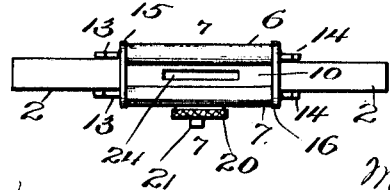
Witnesses
J. M. Fowler Jr.
A. S. Kitchin
Inventors
Marion F. Higbee
By Mason Fenwick & Lawrence
his Attorneys

UNITED STATES PATENT OFFICE.

MARION F. HIGBEE, OF SALAMANCA, NEW YORK.

RAKER-GAGE.

1,003,904.  Specification of Letters Patent.  Patented Sept. 19, 1911.

Application filed January 7, 1911. Serial No. 601,382.

*To all whom it may concern:*

Be it known that I, MARION F. HIGBEE, a citizen of the United States, residing at Salamanca, in the county of Cattaraugus and State of New York, have invented certain new and useful Improvements in Raker-Gages; and I do hereby declare the following to be a full, clear, and exact description of the invention, such as will enable others skilled in the art to which it appertains to make and use the same.

This invention relates to improvements in saw gages, and particularly to gages for gaging or measuring the height of the raker teeth.

The object in view is the arrangement of a raker gage which will instantly indicate the condition of the raker teeth on being placed in position.

Another object in view is the arrangement in a raker gage of means for adjusting the indicating part thereof so as to permit the proper filing of the teeth.

A still further object of the invention is the arrangement of a raker gage having a folded portion designed to fit over the teeth of a saw, and an adjustable raker engaging and measuring member adapted to permit the filing of the raker teeth so that the same will be the desired height in respect to the cutting teeth of the saw.

With these and other objects in view the invention comprises certain novel constructions, combinations, and arrangement of parts as will be hereinafter more fully described and claimed.

In the accompanying drawings: Figure 1 is a perspective view of an embodiment of the invention. Fig. 2 is a side view of the structure shown in Fig. 1, the same being shown applied. Fig. 3 is an end view of the gage shown in Fig. 2. Fig. 4 is a view disclosing a blank of part of the gage. Fig. 5 is a view disclosing a blank of the adjustable part of the gage. Fig. 6 is a top plan view of the gage shown in Fig. 1. Fig. 7 is a section through Fig. 6 on line 7—7.

In constructing an embodiment of the invention a plate, provided preferably with a rectangular aperture, is bent upon itself so as to form a substantially U-shaped member with a notch therein. In the notch is positioned an adjustable member having flanges slipping over part of the plate so as to guide the adjustable member as the same is moved. A suitable tension member is provided for clamping the adjustable member in any desired position so as to permit the proper operation upon all of the raker teeth of the saw.

In order that the invention may be more clearly understood an embodiment of the same is shown in the accompanying drawings in which 1 indicates the blank from which the guiding frame 2 is made. In making the guiding frame 2 the blank 1 is bent upon itself until a substantially U-shaped structure is presented having a notch 3 formed therein. In notch 3 is arranged an adjustable measuring or indicating member 4 which is designed to indicate the relative heights of the raker teeth, and also indicate what the heights of the raker teeth should be. Indicating member 4 comprises blank 5, shown in Fig. 5, and rollers 6 and 7, shown in Fig. 6. Blank 5 is bent for forming turned over portions 8 and 9 telescoping or sliding over the lower part of guiding frame 2 just below opening 3, and together with connecting or top member 10 forms substantially a U-shaped structure. Blank 5 is formed with projections 11 and 12 which are bent so as to form indicating members 13—13 and 14—14, as well as roller supporting ears or journal members 15 and 16. Members 13—13 and 14—14 are formed with pointed ends which pass over scales 17 arranged on both sides of the guiding frame 2, and on opposite sides of the opening or notch 3. The ears 15 and 16 are provided with suitable apertures in which the reduced ends of rollers 6 and 7 are positioned so that the upper edge of the rollers are in the same plane for permitting the use of instruments on either side, and indicating on either side of the height of the raker teeth 18 of saw 19. Member 4 is designed to be slid up or down as the case may be for causing the upper edge of the rollers 6 and 7 to approach or recede from the upper edge of the guiding frame 2 and in order to retain member 4 in any position in which it is placed a thumb member 20 is provided which is threaded on a stud 21 rigidly secured to guiding frame 2 by any desired means, as for instance by being riveted or upset at 22 as well as threaded into member 2. Stud 21 projects through a slot 23 of member 4 so as to permit the free movement of member 4 whenever thumb member is loose.

In order to accommodate any of the raker teeth 18 a slot 24 is provided in top or cross piece 10 and is made sufficiently large to permit the free entrance and withdrawal of the tooth, but prevents any substantially longitudinal movement of the instrument when the tooth is projecting through the slot.

In sharpening and setting a saw it is desirable to have all of the cutting teeth of practically the same height, and to have the raker teeth of a slightly less height, so as to permit the free removal of the chips or saw dust. When cutting hard wood for instance it is preferable to have the raker teeth formed slightly shorter than the cutting teeth, while in cutting comparatively soft wood it is preferable to have the raker teeth considerably shorter than the cutting teeth. The raker gage embodying the invention when placed in position clearly indicates the relative height of any particular raker tooth with the corresponding cutting tooth, so that the same may be filed off or otherwise acted upon as desired. Also by the adjustable feature of indicating member 4 the exact amount of matter removed may be determined, or rather the exact distance between the height of the cutting teeth and the raker teeth may be determined. After the indicating member 4 has been once set for any particular saw, and for any particular grade of wood the thumb member 20 is tightened and the device is used on all of the raker teeth successively until all of the same are in the desired condition, the device being used without any adjustment or change whatever except the movement of the gage from one raker tooth to another.

What I claim is:

1. In a device of the character described, a guiding frame formed with a notch therein, an indicating member arranged to telescope over part of the frame and to partly occupy said notch, said indicating member comprising a substantially U-shaped portion formed with a slot in one side thereof, and a pair of upstanding ears, and a pair of parallel rollers spaced apart, said U-shaped portion being formed with a slot therein opposite the opening between said rollers for permitting the passage therethrough and between said rollers of a saw tooth when the device is being operated, and a clamping member for clamping the connecting member to the frame.

2. In a device of the character described, a substantially U-shaped frame formed with a notch therein, an indicating member arranged to telescope over part of the frame and to partly occupy said notch, said indicating member comprising a substantially U-shaped portion formed with a slot for accommodating a saw tooth, and a pair of upstanding ears, a pair of rollers journaled in said ears and arranged with a space therebetween in line with the slot in said U-shaped portion, and an adjustable clamp for clamping said U-shaped portion in any of its adjusted positions.

3. In a device of the character described, a guiding frame formed with a notch therein, an indicating member arranged to telescope over part of the frame and to partly occupy said notch, said indicating member comprising a substantially U-shaped portion formed with a slot on one side thereof, a plurality of indicating pointers for indicating the relative position of said frame and said indicating member, and a pair of upstanding ears, and a pair of parallel rollers spaced apart, said U-shaped portion being formed with a slot therein opposite the opening between said rollers for permitting the passage therethrough and between said rollers of a saw tooth when the device is being operated, and a clamping member for clamping the indicating member to the frame, said clamping member being formed with a stem projecting through a slot in said substantially U-shaped portion of said indicating member.

In testimony whereof I affix my signature in presence of two witnesses.

MARION F. HIGBEE.

Witnesses:
W. A. HEVENOR,
BURDETTE WHIPPLE.